United States Patent
McCrossin et al.

(10) Patent No.: US 6,533,372 B1
(45) Date of Patent: Mar. 18, 2003

(54) BEVERAGE CART

(75) Inventors: Thomas K. McCrossin, Boothwyn, PA (US); Carl D. Hipp, West Chester, PA (US)

(73) Assignee: Nolu Plastics, Inc., Aston, PA (US)

( * ) Notice: Subject to any disclaimer, the term of this patent is extended or adjusted under 35 U.S.C. 154(b) by 0 days.

(21) Appl. No.: 09/573,689

(22) Filed: May 19, 2000

Related U.S. Application Data

(60) Provisional application No. 60/144,072, filed on Jul. 16, 1999.

(51) Int. Cl.⁷ .................................................. A47B 9/00
(52) U.S. Cl. .............................. 312/140.4; 312/265.5; 108/92; 108/180
(58) Field of Search ............................ 312/140.1, 140.3, 312/140.4, 140.2, 111, 107, 284, 285, 257.1, 263, 265.5, 249.8; 108/59, 92, 180

(56) References Cited

U.S. PATENT DOCUMENTS

| | | | |
|---|---|---|---|
| 2,966,385 A | * 12/1960 | Murphy et al. ...... 312/265.5 X |
| 3,868,123 A | 2/1975 | Berg et al. ................. 280/79.2 |
| 4,008,931 A | 2/1977 | Kennedy, Jr. et al. ...... 312/111 |
| 4,076,349 A | 2/1978 | Gettleman et al. .......... 312/236 |
| 4,743,040 A | 5/1988 | Breveglieri et al. ..... 280/47.35 |
| D302,064 S | 7/1989 | Delmerico ................... D34/20 |
| D303,307 S | 9/1989 | Juergens ...................... D34/19 |
| 4,886,286 A | 12/1989 | Whorton, III ............ 280/47.35 |
| 4,898,294 A | 2/1990 | Jennings ...................... 220/3.1 |
| D312,524 S | 11/1990 | Juergens ...................... D34/20 |
| 4,974,500 A | 12/1990 | Boyd et al. ................... 99/279 |
| 4,998,023 A | 3/1991 | Kitts ........................ 280/47.35 |
| 5,016,948 A | 5/1991 | Welch et al. ................ 312/250 |
| 5,040,811 A | 8/1991 | Busken et al. ........... 280/47.34 |
| 5,069,466 A | 12/1991 | Propst ....................... 280/79.3 |
| 5,083,805 A | 1/1992 | Monch et al. ........... 280/47.35 |
| 5,127,762 A | 7/1992 | Havlovitz ................... 403/298 |
| 5,269,545 A | 12/1993 | Huebschen et al. ...... 280/47.35 |
| 5,368,380 A | 11/1994 | Mottmiller et al. ......... 312/263 |
| 5,390,834 A | 2/1995 | Bitter et al. ................. 222/608 |
| D361,187 S | 8/1995 | Snell ........................... D34/21 |
| 5,531,464 A | 7/1996 | Maurer et al. ........... 280/47.35 |
| 5,566,961 A | 10/1996 | Snell et al. .............. 280/47.35 |
| 5,605,344 A | 2/1997 | Insalaco et al. .......... 280/47.34 |
| 5,613,746 A | 3/1997 | Green et al. ................. 312/194 |
| 5,626,353 A | 5/1997 | Campbell ................. 280/47.35 |
| D381,168 S | 7/1997 | Delmerico et al. .......... D34/21 |
| D391,032 S | 2/1998 | Delmerico .................... D34/21 |
| 5,887,878 A | 3/1999 | Tisbo et al. .............. 280/47.19 |
| D408,953 S | 4/1999 | Golichowski et al. ........ D34/21 |
| 5,964,650 A | 10/1999 | Dickinson ................... 280/641 |

* cited by examiner

Primary Examiner—John G. Weiss
Assistant Examiner—Michael J. Fisher
(74) Attorney, Agent, or Firm—Pillsbury Winthrop LLP

(57) ABSTRACT

A beverage cart is described that includes a bottom portion with a substantially rectangular shape, having front, rear, right, and left sides. Upstanding wall portions extend upwardly from the bottom portion at each of the front, rear, right, and left sides, mate with the bottom portion, and rigidly interlock with one another through tongue and groove fasteners provided thereon. A top portion rigidly interlocks with the right and left upstanding wall portions through tongue and groove fasteners provided thereon. At least one intermediate upstanding wall portion is disposed between the right and left upstanding wall portions and rigidly interconnects with the front and rear upstanding wall portions through tongue and groove fasteners provided thereon. At least one horizontal shelf portion is disposed between any two of the upstanding wall portions and rigidly interlocks with the two upstanding wall portions through tongue and groove fasteners provided thereon. At least the rear upstanding wall portion has a central region cut out to permit access to the interior of the beverage cart. The beverage cart's respective components are easily assembled and disassembled and are made of a plastic material such as polypropylene.

29 Claims, 20 Drawing Sheets

BEVERAGE CART

This application claims the benefit of U.S. Provisional Application No. 60/144,072, filed Jul. 16, 1999.

FIELD OF THE INVENTION

The present invention relates to the construction of beverage carts. More specifically, the present invention concerns a mobile beverage cart constructed from a number of separate elements of a lightweight, durable, plastic material that slide together.

BACKGROUND OF THE INVENTION

The National Sanitation Foundation (NSF) sets the standards in the United States for materials that can be used in the manufacture and construction of commercial kitchen equipment. These standards also encompass the materials from which beverage carts may be made. In the past, to ensure that commercial kitchen equipment could be easily cleaned and kept sanitary, the NSF required that beverage carts be made from stainless steel.

While stainless steel is an excellent material for sanitation purposes, there are several disadvantages to the use of stainless steel in beverage carts. First, stainless steel is very heavy. Therefore, beverage carts made from stainless steel are also very heavy. This is a distinct disadvantage because beverage carts, by their very nature, require a light-weight construction for mobility. Second, it is very difficult to make a beverage cart from stainless steel that can be rapidly disassembled, shipped, and quickly reassembled. This is due, in part, to the fact that stainless steel is not a material that can be fashioned into components which may be quickly and easily connected to one another without screws, brackets, fasteners, or welds. Third, stainless steel beverage carts are expensive, not only because of the intensive labor required for their construction, but also because stainless steel itself is an expensive material.

Within the context of this background, beverage sellers have expressed a desire for beverage carts that may be easily moved from one position to another at a particular sales location (e.g., from one part of a stadium to another). In addition, beverage sellers have expressed an interest in beverage cart designs that may be shipped inexpensively from one sales location to another (e.g., from one city to another). Due to their weight, beverage carts made from stainless steel are not easily moved from one position to another within a particular sales location. Also, due to their weight and the fact that the carts cannot be disassembled easily for shipment (if at all), moving beverage carts from one sales location to another can be very expensive.

Recently, the NSF changed its policy with respect to the construction of beverage carts, relaxing the standard so that beverage carts may be constructed from plastic materials instead of stainless steel. The adoption of this new standard permits beverage cart designers to consider options previously unavailable to them. The present invention resulted from the consideration of options that could not have been considered when the NSF required that beverage carts be made from stainless steel.

SUMMARY OF THE INVENTION

The present invention addresses several of the shortcomings with the prior art.

First, the present invention takes advantage of the change in NSF standards to provide a beverage cart made of a plastic material such as polypropylene, which is not only strong, but also scratch resistant. It is also resistant to damage from water, ultra-violet rays and other environmental stresses, which can cause some plastic materials to crack or become porous. For sanitary reasons, beverage carts must be made from materials that resist scratching, cracking, or pitting, because surface irregularities permit bacteria and other biological materials to collect therein.

Second, by constructing a beverage cart from a plastic material, the present invention offers a beverage cart that is lighter in weight than traditional beverage carts. Lighter weight carts are more easily moved from one position to another within a particular selling location (e.g., from one street corner to another). Lighter weight carts also may be shipped from one selling location to another (e.g., from one city to another) at a lower cost than for shipping traditional, stainless steel beverage carts.

Third, the present invention provides a beverage cart that can be easily assembled and disassembled because the individual components have a slide-fit construction. Moreover, the individual components of the beverage cart are flat (i.e., have a thin profile). As a result, carts made according to the teachings of the present invention can be easily disassembled, shipped in a flat state, and, later, quickly reassembled. Accordingly, beverage carts made according to the teachings of the present invention may be shipped very easily and very inexpensively.

Fourth, being constructed from plastic, the color of the beverage cart of the present invention can be tailored to meet the demands of a particular beverage vendor. This means that individual vendors can select a color scheme that best suits their product's image.

The present invention accomplishes these objectives by providing a beverage cart that includes a bottom portion with a substantially rectangular shape, having front, rear, right, and left sides. Upstanding wall portions extend upwardly from the bottom portion at each of the front, rear, right, and left sides, mate with the bottom portion, and rigidly interlock with one another through tongue and groove fasteners provided thereon. A top portion rigidly interlocks with the right and left upstanding wall portions through tongue and groove fasteners provided thereon. At least one intermediate upstanding wall portion is disposed between the right and left upstanding wall portions and rigidly interconnects with the front and rear upstanding wall portions through tongue and groove fasteners provided thereon. At least one horizontal shelf portion is disposed between any two of the upstanding wall portions and rigidly interlocks with the two upstanding wall portions through tongue and groove fasteners provided thereon. At least the rear upstanding wall portion has a central region cut out to permit access to the interior of the beverage cart.

The present invention also fulfills its objectives by providing a beverage cart that further includes a first curved portion extending forwardly from the bottom portion. A first curved groove is cut into a top surface of the first curved portion and extends substantially from the left side to the right side of the bottom portion. A second curved portion extends forwardly from the top portion. A second curved groove is cut into a bottom surface the second curved portion and extends substantially from the left side to the right side of the top portion. A flexible sheet slides into and is containable between the first and second grooves.

The present invention further accomplishes its objectives by providing a beverage cart that includes at least one vertical support extending upwardly from the top portion.

The cart also includes a canopy, connected to the at least one vertical support, extending over at least part of the top portion of the beverage cart.

The beverage cart may also include a storage compartment within the canopy. In addition, the canopy may be adjustable in height relative to the top portion.

So that the beverage cart is moveable, wheels may be attached to a bottom side of the bottom portion.

The beverage cart of the present invention includes components that are easily assembled and disassembled. Those components may be made of plastic, such as polypropylene, which is scratch resistant and resistant to wear by environmental elements such as water and ultra-violet light.

The present invention also fulfills its objectives by providing a beverage cart where the right and left upstanding sides are L-shaped, thereby providing upper and lower connecting portions. In addition, the top portion includes a first top portion and a second top portion. The first top portion rigidly interconnects with the upper connecting portions of the right and left upstanding sides and the second top portion rigidly interconnects with the lower connecting portion of the right and left upstanding sides.

In this embodiment of the beverage cart of the present invention, a first curved portion extends forwardly from the bottom portion. A first curved groove is cut into a top surface of the first curved portion and extends substantially from the left side to the right side of the bottom portion. A second curved portion extending forwardly from the first top portion. A second curved groove is cut into a bottom surface the second curved portion and extends substantially from the left side to the right side of the first top portion. Also, a flexible sheet slides into and is containable between the first and second grooves.

The preferred embodiments of the beverage cart incorporating the inventive concepts of the present invention are shown by way of example in the accompanying drawings without attempting to show all of the various forms and modifications in which the invention might be embodied, the invention being measured by the appended claims and not solely by the details of the specification.

DESCRIPTION OF THE PREFERRED EMBODIMENTS

Figure 1:
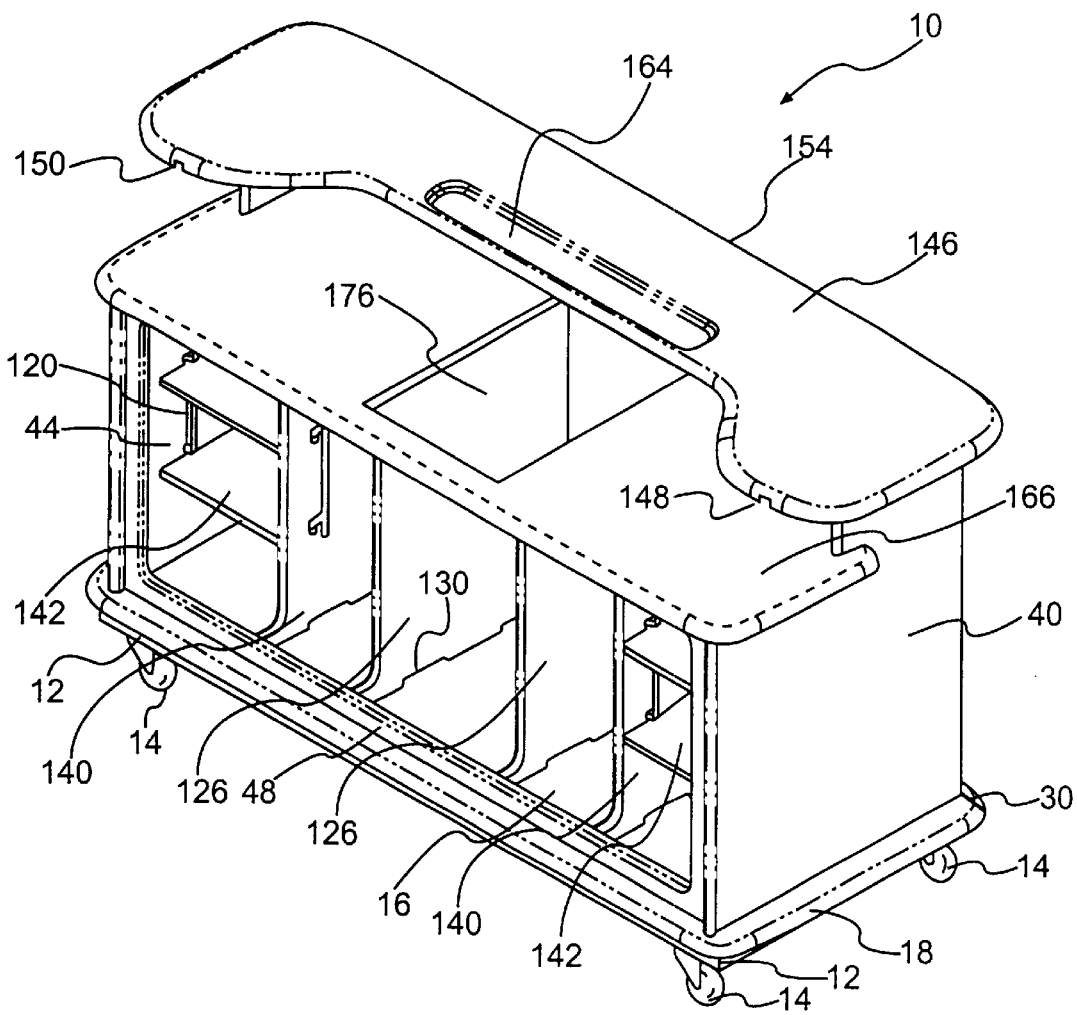
FIG. 1 is a perspective view of a first embodiment of the beverage cart according to the teachings of the present invention.
Figure 2:
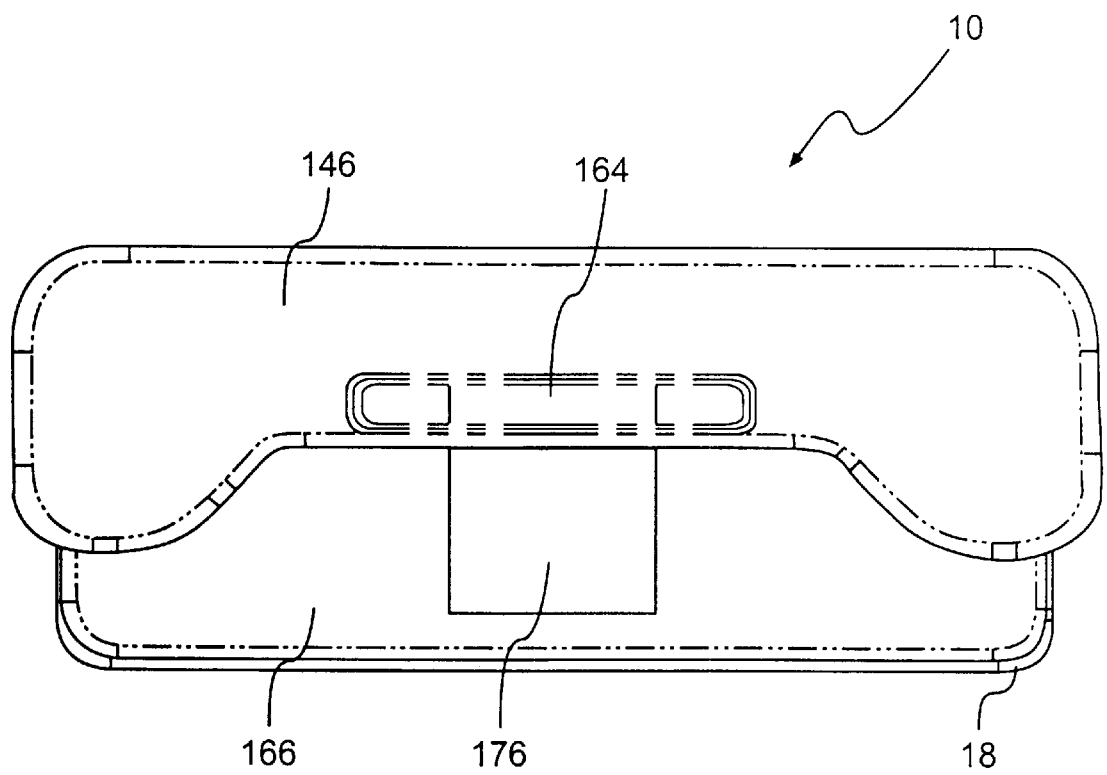
FIG. 2 is a top view illustration of the beverage cart shown in FIG. 1.
Figure 3:
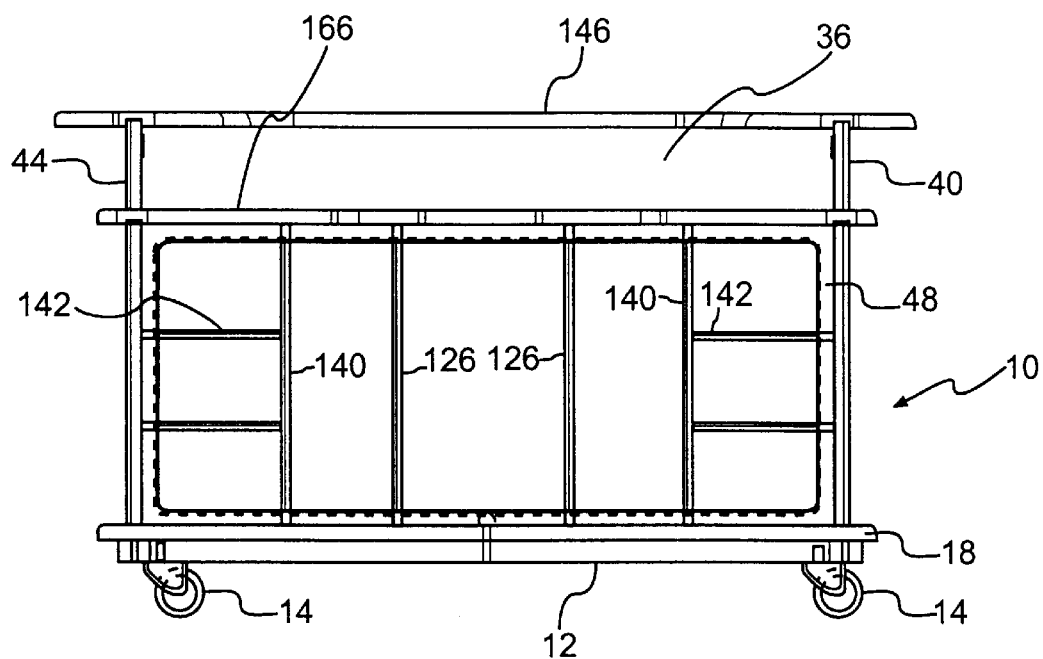
FIG. 3 is a rear view illustration of the beverage cart shown in FIG. 1.
Figure 4:
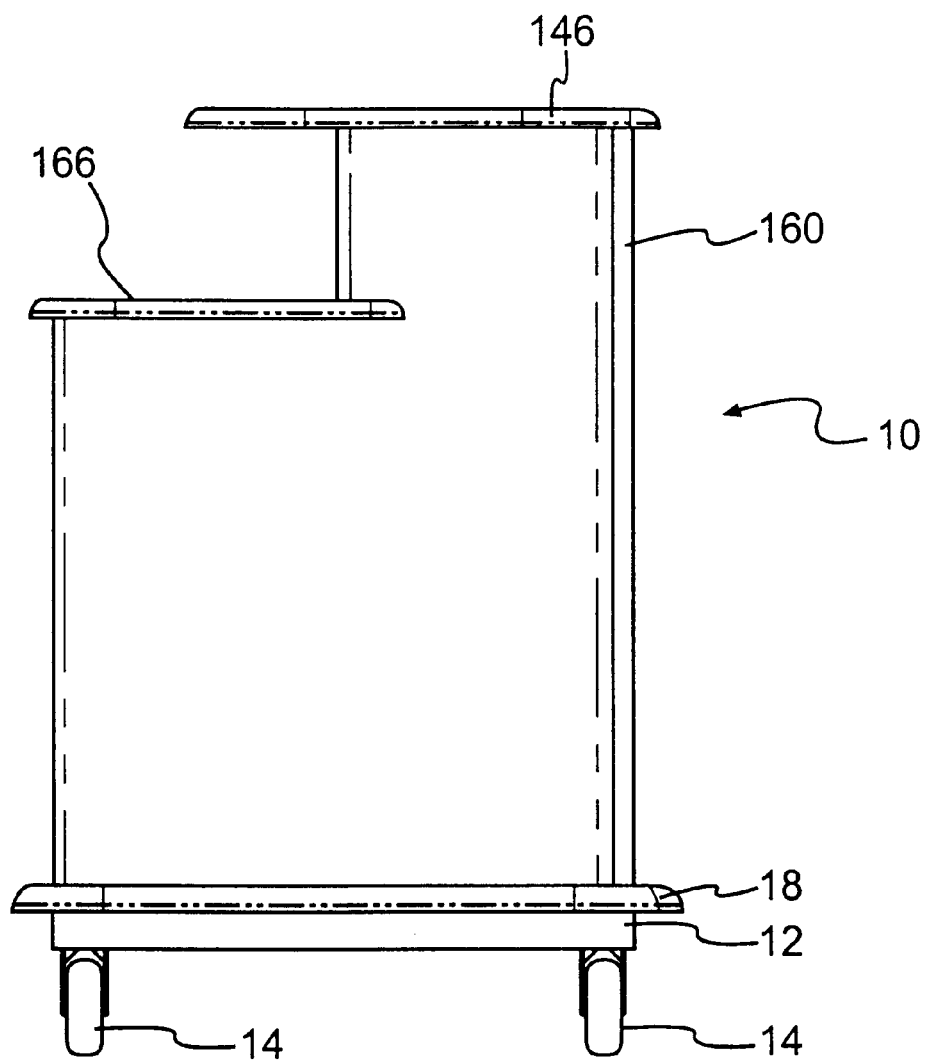
FIG. 4 is a right side view illustration of the beverage cart shown in FIG. 1, the left side view being a mirror image thereof.
Figure 6:
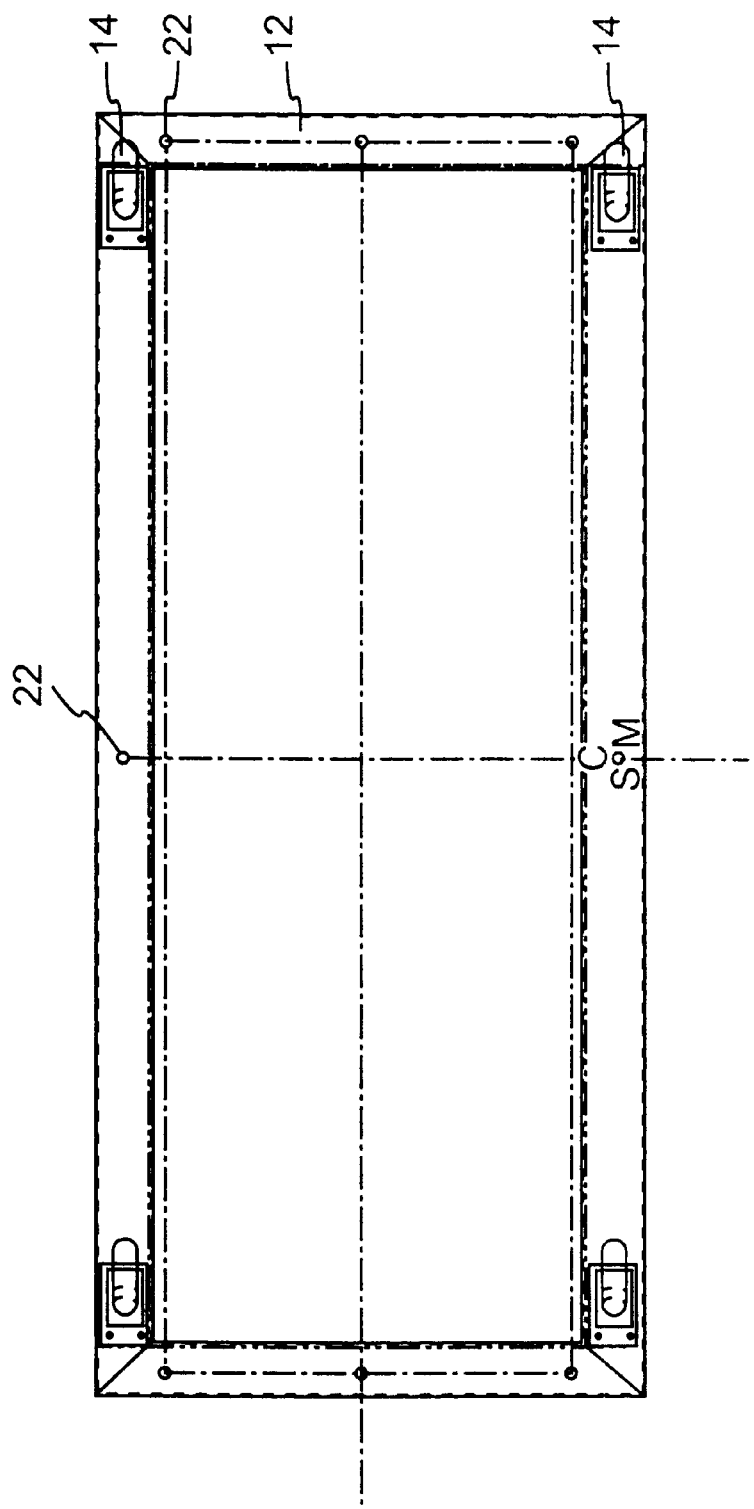
FIG. 6 is a bottom view of a bottom frame of the beverage cart illustrated in FIG. 1.

FIG. 1 shows a first embodiment of a beverage cart 10 according to the teachings of the present invention. Beverage cart 10 includes a bottom frame 12, which is a rectangular frame with wheels 14 attached to its bottom surface 16. FIG. 6 illustrates bottom frame 12 from a bottom view. It is upon the platform provided by bottom frame 12 that beverage cart 10 is constructed.

It is preferred that bottom frame 12 be constructed from steel so that frame 12 can support the weight of the various components of beverage cart 10. However, it is believed that a plastic material such as polypropylene or high density polyethylene (HDPE) could also be used for bottom frame 12 if beverage cart 10 is sufficiently light-weight. Regardless of the material chosen, bottom frame 12 should be a strong element of beverage cart 10, which is important to the cart's construction because bottom frame 12 carries the weight of beverage cart 10 once it is assembled. Of course, as would be readily apparent to those skilled in the art, alternate materials, such as wood, aluminum, or any other metal or composite material, could be used for the construction of bottom frame 12.

A bottom panel 18 is positioned atop bottom frame 12. As with the remaining components of beverage cart 10, bottom panel 18 is preferably constructed from a plastic material such as polypropylene. Alternately, HDPE could be used, as could any other plastic material that can provide a rigid yet light-weight construction.

Bottom panel 18 need not be attached to bottom frame 12, but it should be reasonably centered over bottom frame 12 so that beverage cart 10, once assembled, does not tip over. To facilitate centering of bottom panel 18 on bottom frame 12, bottom panel 18 may be provided with alignment holes 20 that mate with alignment holes 22 disposed through bottom frame 12. Furthermore, to connect bottom panel 18 to bottom frame 12, pins (not shown) may extend through alignment holes 20 and 22 between bottom panel 18 and bottom frame 12.

Figure 7:
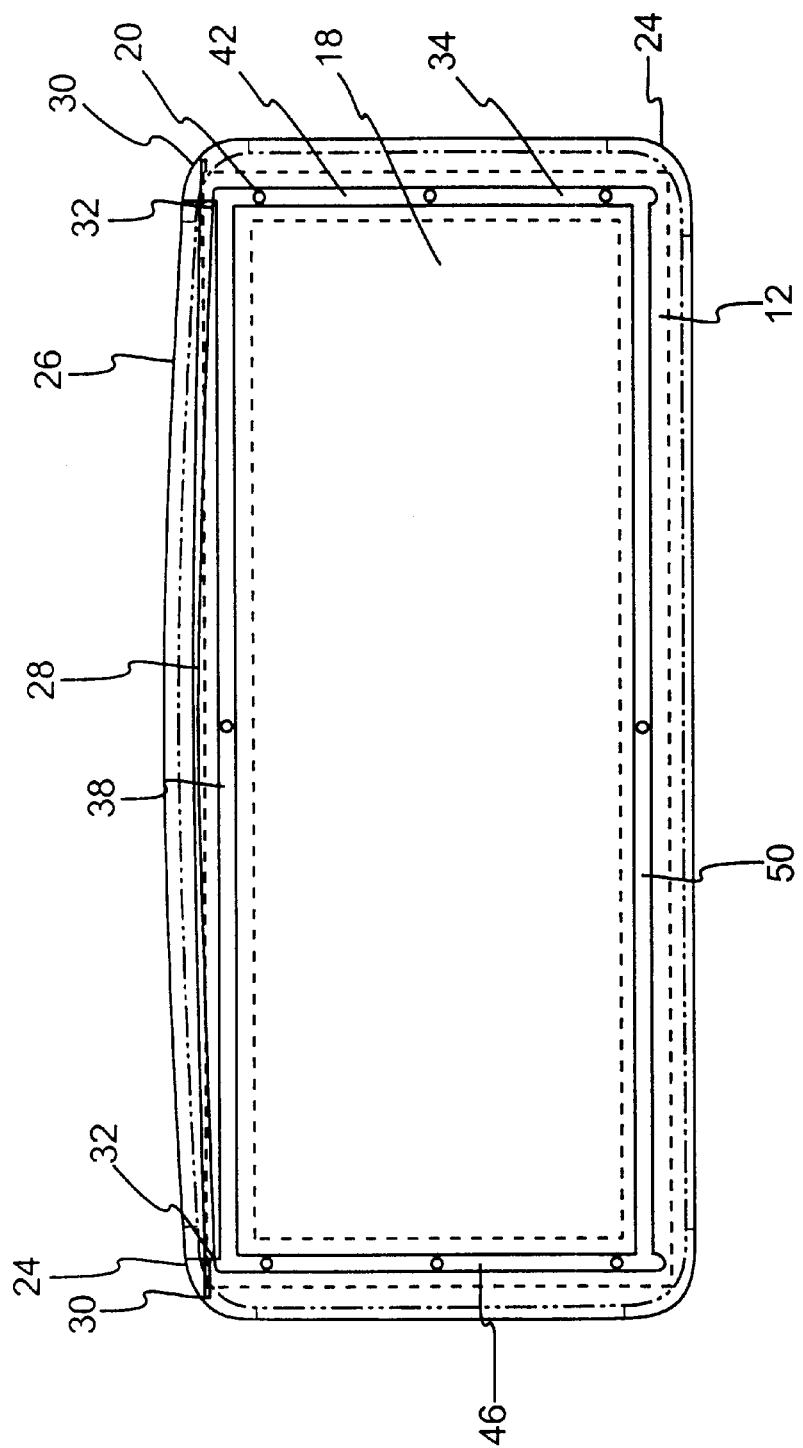
FIG. 7 is a top view of a bottom panel of the beverage cart illustrated in FIG. 1.

As illustrated in FIG. 7, bottom panel 18 is substantially rectangular in shape with rounded corners 24. A front edge 26 of bottom panel 18 curves outwardly from the main area of bottom panel 18. A curved groove 28 is provided in the top surface of bottom panel 18 just inside of front edge 26. An entry area 30 is provided at either end of curved groove 28 so that an advertising panel 160 can be slid into curved groove 28 from either side of beverage cart 10. A notch 32 is provided in curved groove 28 just inside of entry area 30 on either side on bottom panel 18. Notches 32 are offset rearwardly from front edge 26. After advertising panel 160 is inserted into curved groove 28, notches 32 hold advertising panel 160 in place at the front of beverage cart 10. Curved groove 28 has a counterpart in a first top panel 146 of beverage cart 10, which will be described in detail below. Advertising panel 160, therefore, is held securely between bottom panel 18 and first top panel 146.

Bottom panel 18 also includes a rectangular groove 34 in its top surface. Rectangular groove 34 is provided to mate with the wall panels of beverage cart 10. Front wall panel 36 fits into front groove 38. Right wall panel 40 fits into right groove 42. Left wall panel 44 fits into left groove 46. And rear wall panel 48 fits into groove 50. Each of grooves 38, 42, 46, and 50 are shown as essentially rectangularly-shaped grooves in cross-section. It is possible that the front wall panel 36, right wall panel 40, left wall panel 44 or rear wall panel 48 might be provided with tabs or protrusions that would be fashioned to fit within slots cut into grove 34. However, it is preferred that the bottom edges of each of the wall panels be flat for ease of manufacture.

Figure 8:
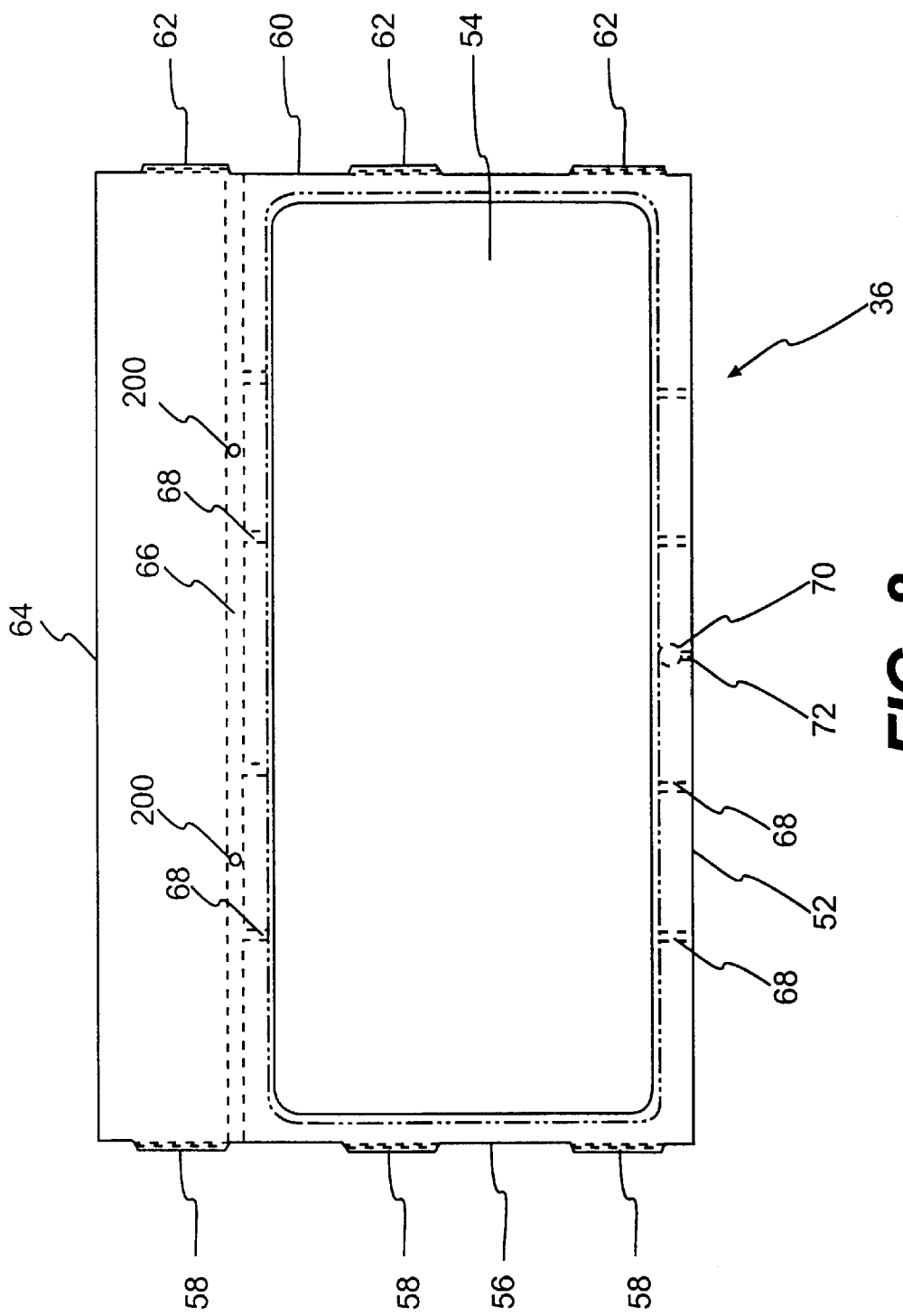
FIG. 8 is an elevational view of a front panel of the beverage cart illustrated in FIG. 1.

FIG. 8 shows a front view of front wall panel 36. A bottom edge 52 of front wall panel 36 is substantially flat to fit into front groove 38 in bottom panel 18. Front wall panel 36 includes a central opening 54, which permits front wall panel 36 to be made as light (in weight) as possible. A right edge 56 (which appears on the left side of FIG. 8 because FIG. 8 is a front view of front wall panel 36) of front wall panel 36 mates with right wall panel 40. Right edge 56 includes at least one tab 58, and preferably three tabs 58, disposed at regular intervals along its length. Tabs 58 are essentially T-shaped elements that are molded with front wall panel 36. Tabs 58 slide into a groove 82 in right wall panel 40 to rigidly interconnect right wall panel 40 and front wall panel 36 together. Similarly, left edge 60 of front wall panel 36 includes at least one tab 62, and preferably three tabs 62, disposed at regular intervals along its length. Tabs 62 have the same T-shaped structure as tabs 58, except that they have the opposite orientation to tabs 58 because they are on left edge 60 of front wall panel 36. Tabs 62 slidably engage a groove 82 in left wall panel 44 in the same manner that tabs 58 slidably engage groove 82 in right wall panel 40. When tabs 62 engage groove 82 in left wall panel 44, front wall panel 36 and left wall panel 44 rigidly interconnect with one another.

Front wall panel 36 also has an extended area 64 that extends upwardly from central opening 54. Extended area 64 acts as a backsplash for a sink 178 in second top portion of beverage cart 10 when it is assembled.

Front wall panel 36 also includes a horizontal groove 66, which mates with a front edge of second top panel 166. At least one vertical groove 68, and preferably four vertical grooves 68 are also provided in the rear surface of front wall panel 36. Each of vertical grooves 68 are provided to slidably mate with intermediate wall panels 126 or shelf wall panels 140 disposed between right wall panel 40 and left wall panel 44.

Front wall panel 36 also includes at least one access hole 70 coupled to an alignment hole 72. Alignment hole 72 corresponds to alignment hole 20 in bottom panel 18 and alignment hole 22 in bottom frame 12. As indicated above, a pin (not shown) can be inserted through access hole 70 and inserted into alignment hole 72 to connect front wall panel 36, bottom panel 18, and bottom frame 12 together.

Figure 5:
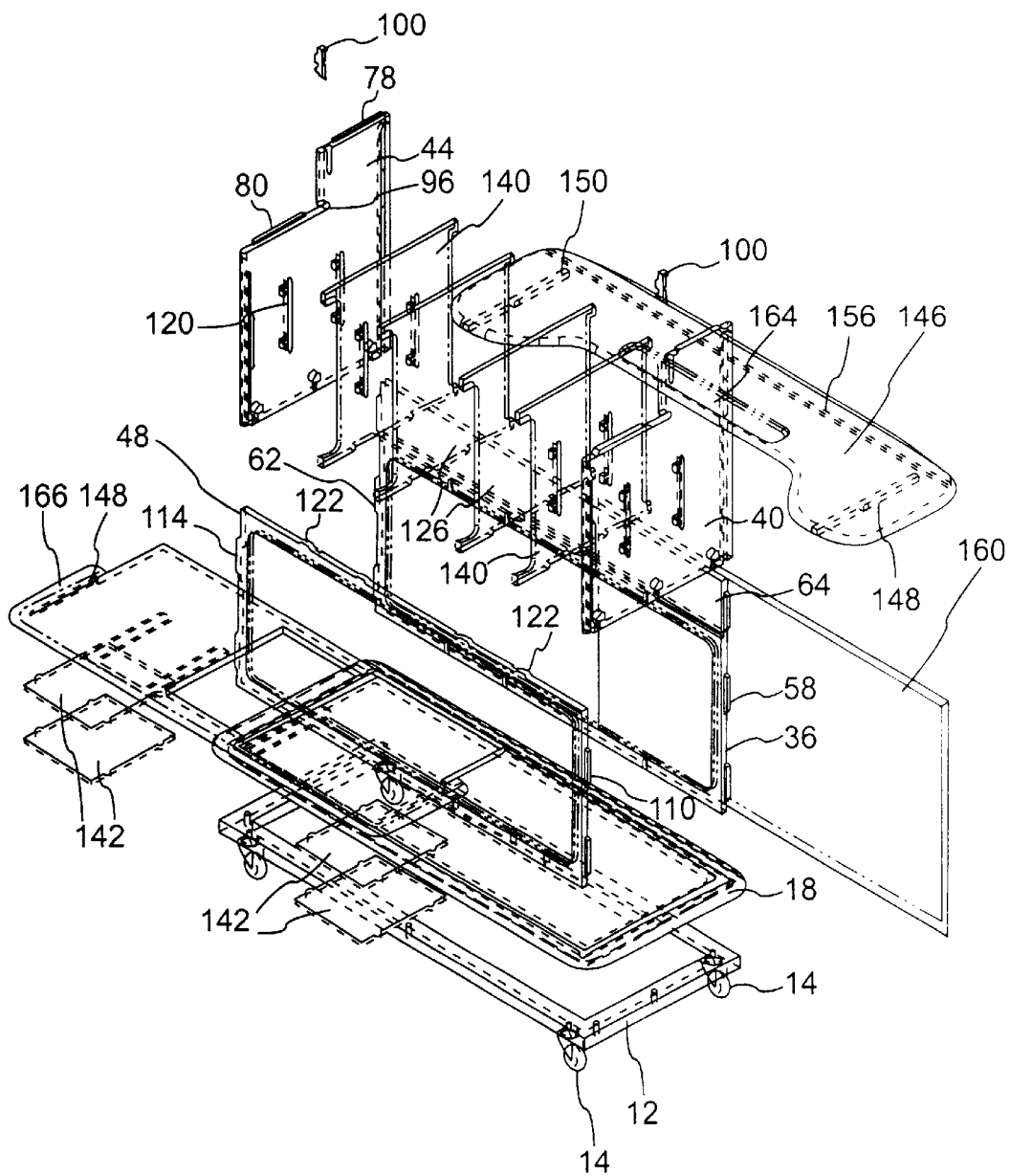
FIG. 5 is a perspective view of the beverage cart illustrated in FIG. 1, showing the beverage cart in a disassembled condition.
Figure 10:
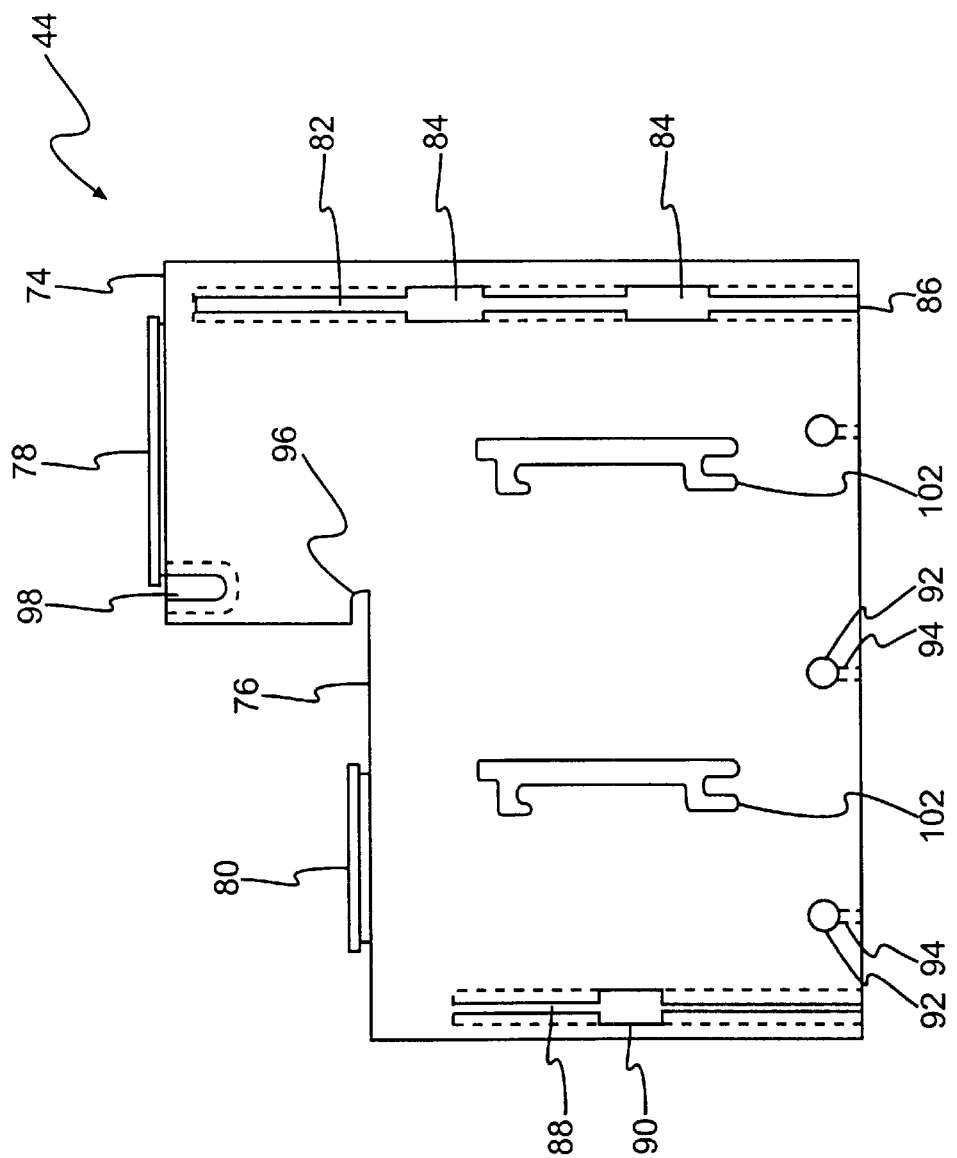
FIG. 10 is an elevational view of a side panel of the beverage cart illustrated in FIG. 1.

FIG. 10 shown the inside surface of left wall panel 44. As illustrated in FIG. 5, right wall panel 40 is a mirror image of left wall panel 44. Left wall panel 44 is essentially L-shaped. A first top edge 74 of left wall panel 44 sits at a higher elevation than second top edge 76. First top edge 74 includes at least one tab 78 attached thereto. Tab 78 is T-shaped and designed to slidably interlock with first top panel 146 of beverage cart 10. Second top edge 76 include a tab 80 that is also T-shaped and designed to slidably interlock with second top panel 166.

Left wall panel 44 also includes a front groove 82. Front groove 82 slidably engages tabs 62 on front wall panel 36 so that left wall panel 44 and front wall panel 36 can be rigidly interlocked. Front groove 82 may also include at least one tab access hole 84, and preferably two tab access holes 84. Tab access holes 84 permit the interlocking of left wall panel 44 and front wall panel 36 without having to lift left wall panel 44 so that all of tabs 62 are inserted through a bottom 86 of front groove 82. With two tab access holes 84, only the bottom most of tabs 62 are inserted through bottom 86 of front groove 82. The other two tabs 62 are inserted into front groove 82 through their respective tab access holes 84.

Similarly, left wall panel 44 is provided with a rear groove 88. Rear groove 88 is designed to interlock with tabs 114 from rear wall panel 48. Like front groove 82, rear groove 88 also includes at least one tab access hole 90. Tab access hole 90 acts in the same manner as tab access holes 84 to facilitate assembly of beverage cart 10.

Left wall panel 44 also includes at least one access hole 92 coupled to an alignment hole 94. Access holes 92 and alignment holes 94 are provided for the same purposes as access hole 70 and alignment hole 72 in front wall panel 36. Alignment holes 94 align with alignment holes 20 in left groove 46 of bottom panel 18.

Left wall panel 44 also includes a notch 96 that extends into left wall panel 44 from second top edge 76. Notch 96 is designed to accommodate second top panel 166 when beverage cart 10 is assembled.

Figure 17:
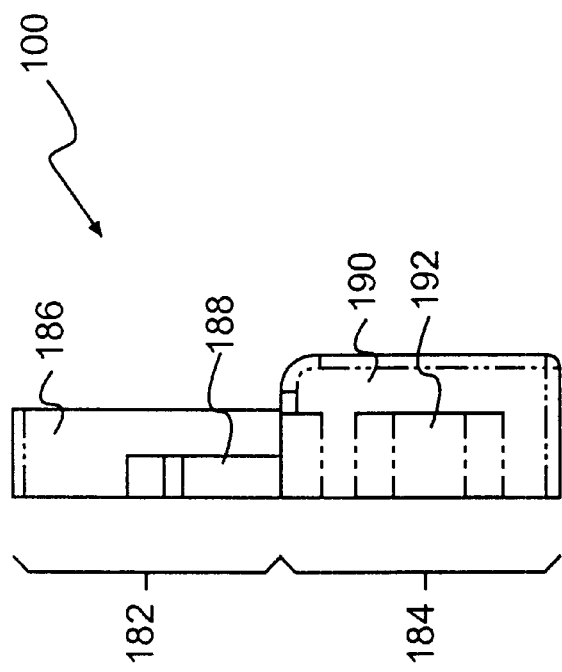
FIG. 17 is a side view of the connector illustrated in FIG. 16.
Figure 16:
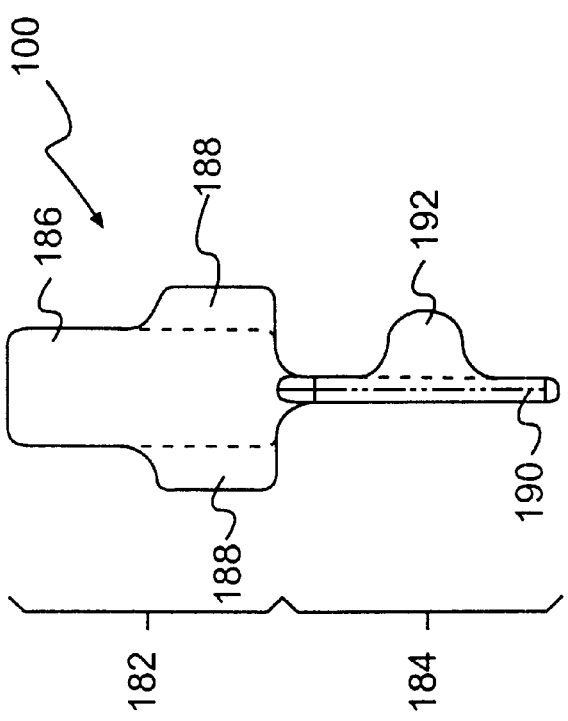
FIG. 16 is an elevational view of a connector element of the beverage cart illustrated in FIG. 1.

Left wall panel also includes an attachment groove 98 extending into left wall panel 44 from first top edge 74. Attachment groove 98 is designed to accept an attachment element 100, which is illustrated in FIGS. 16 and 17. Attachment element 100 will be described in greater detail below.

Left wall panel 44 also includes a pair of shelf grooves 102. Shelf grooves 102 are elongate grooves that extend less than all of the way through the thickness of left wall panel 44. Shelf grooves 102 are designed to accept tabs from a shelf (illustrated in greater detail in FIG. 13) so that shelf will be securely positioned within beverage cart 10. Shelf grooves 102 are designed so that shelves may be positioned in or removed from beverage cart 10 after its assembly.

Figure 9:
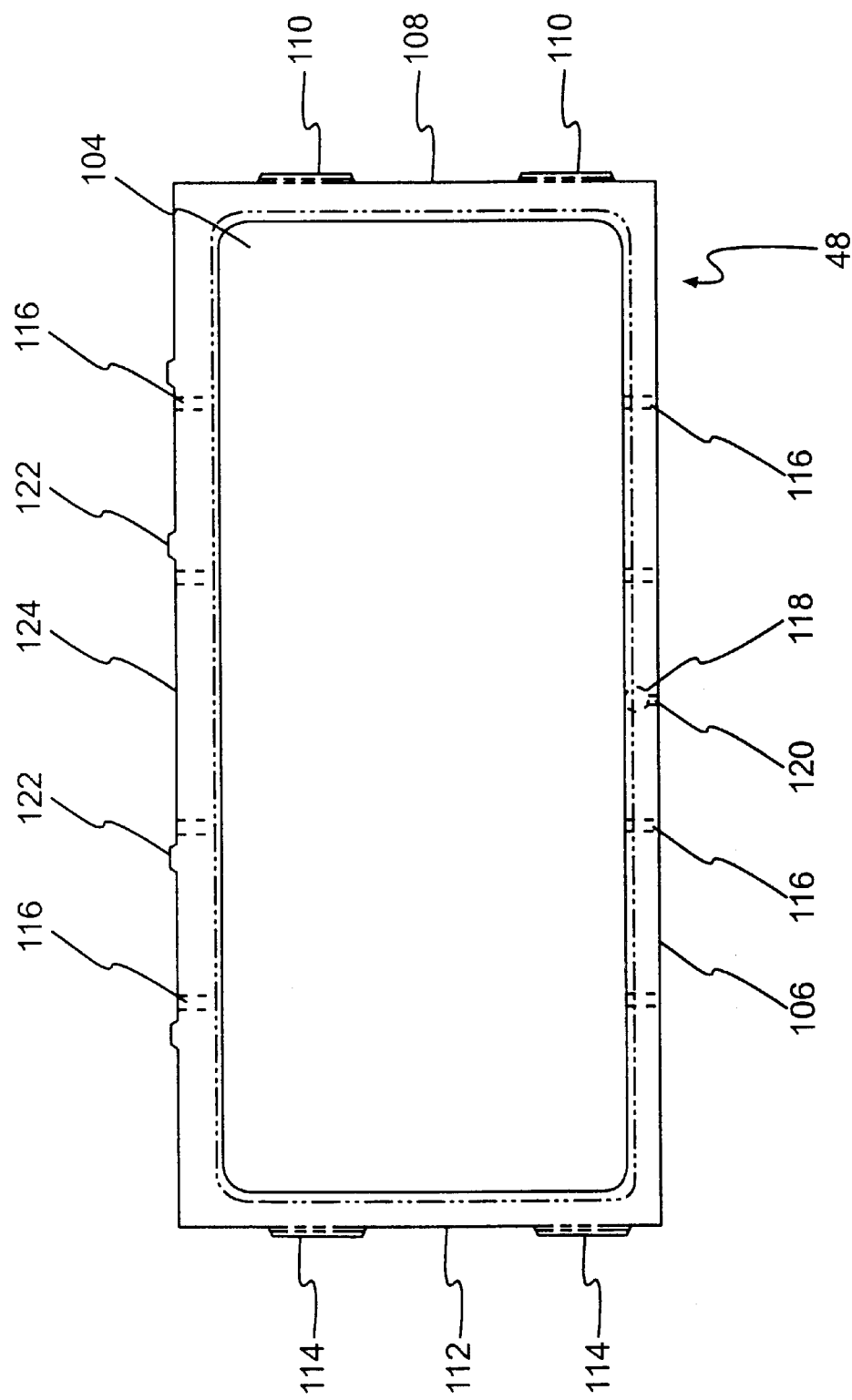
FIG. 9 is an elevational view of a rear panel of the beverage cart illustrated in FIG. 1.

Rear wall panel 48 is shown in greater detail in FIG. 9. Rear wall panel 48 has a central opening 104. Central opening 104 not only reduces the weight of rear wall panel 48, but it also provides an opening through which items contained within beverage cart 10 can be accessed. Bottom edge 106 of rear wall panel 48 is essentially a straight edge. Bottom edge 106 engages rear groove 50 on bottom panel 18. Right edge 108 has tabs 110 attached thereto. Tabs 110 are T-shaped and are designed to interlock with right wall panel 40. Left edge 112 includes tabs 114 that interlock with left wall panel 44.

Rear wall panel 48 also includes vertical grooves 116 that are adapted to accept and hold intermediate wall panels 126 or shelf wall panels 140 therein. Vertical groves 116 are aligned with vertical grooves 68 on front wall panel 36. As such, when intermediate wall panels 126 or shelf wall panels 140 are inserted into vertical groves 68, 116, they are held in place thereby.

Rear wall panel 48 also includes an access hole 118 and an alignment hole 120 that aligns with alignment hole 20 in rear groove 50 on bottom panel 18. Rear wall panel 48 also includes tabs 122 on its top edge 124. Tabs 122 are designed to engage the bottom surface of second top panel 166 when beverage cart 10 is fully assembled.

Figure 11:
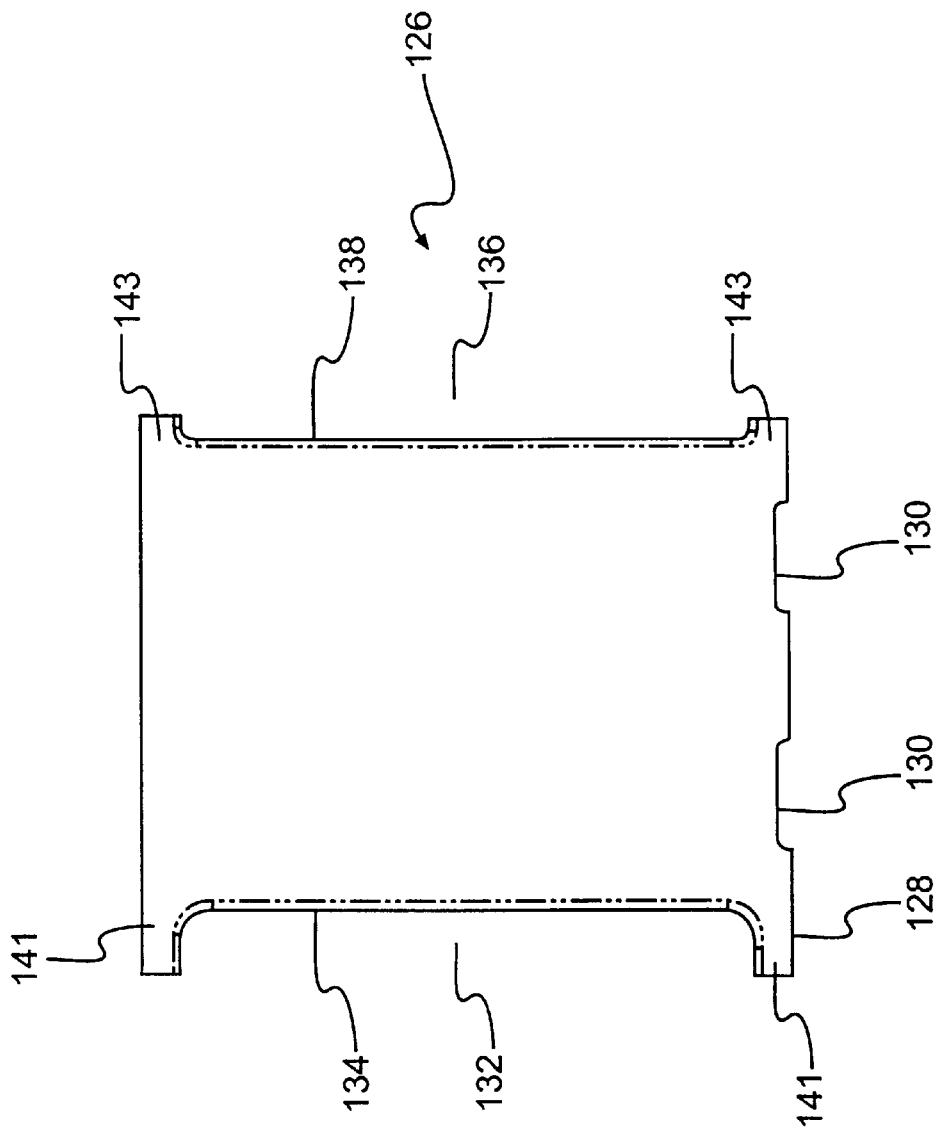
FIG. 11 is an elevational view of an intermediate upstanding wall panel of the beverage cart illustrated in FIG. 1.

As shown in FIG. 11, intermediate wall panel 126 is a flat element that is disposed between right wall panel 40 and left wall panel 44 on beverage cart 10. Intermediate wall panel 126 has a bottom edge 128 that is shown with cut out portions 130. Cut out portions 130, however, need not be provided along bottom edge 128 of intermediate wall 126.

Intermediate wall 126 also includes an indentation 132 at its rear edge 134. Similarly, intermediate wall 126 has an indentation 136 along its front edge 138. Indentations 132 and 136 help to lighten the overall weight of intermediate wall 126. They also help to define rear tabs 141 and front tabs 143. Rear tabs 141 engage vertical grooves 116 in rear wall panel 48. Front tabs 143 engage vertical grooves 68 in front wall panel 36.

Figure 12:
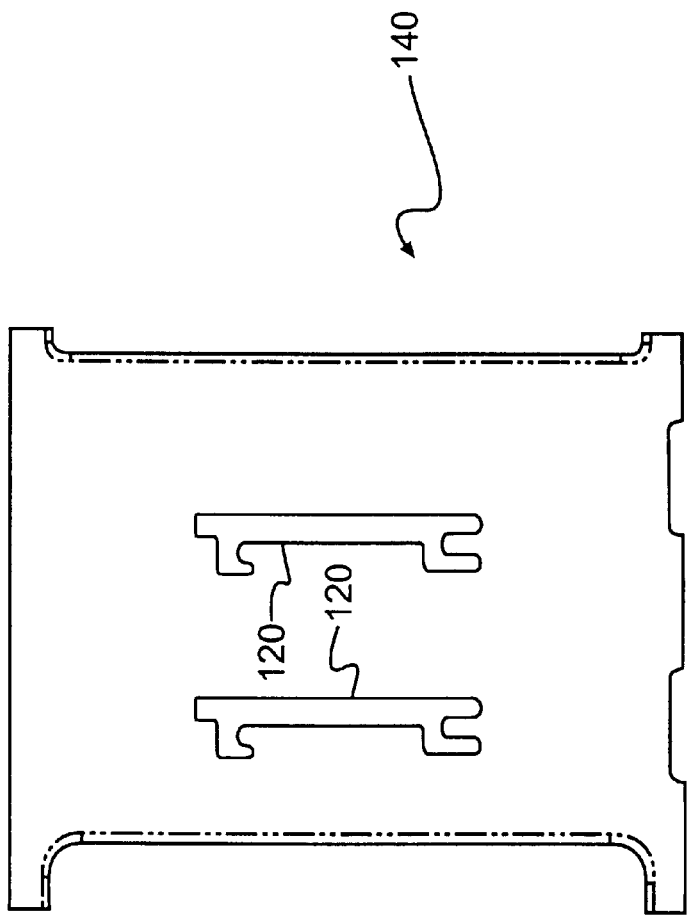
FIG. 12 is an elevational view of a shelf wall panel of the beverage cart illustrated in FIG. 1.

Intermediate wall panel 126, however, is not the only type of wall panel that can be disposed between right wall panel 40 and left wall panel 44. Shelf wall panel 140, as illustrated in greater detail in FIG. 12, may also be disposed therebetween. Shelf wall panel 140 is exactly the same as intermediate wall panel 126 except that it includes shelf grooves 120. Shelf grooves 120 may extend all of the way through shelf wall panel 140 or only part way through shelf wall panel 140, as would be understood by those skilled in the art. It is preferred, however, that shelf groove 120 extend all of the way through shelf wall panel 140 so that, when beverage cart 10 is assembled, the orientation of shelf wall panel 140 does not affect the placement of shelf wall panel 140 between right wall panel 40 and left wall panel 44.

Figure 13:
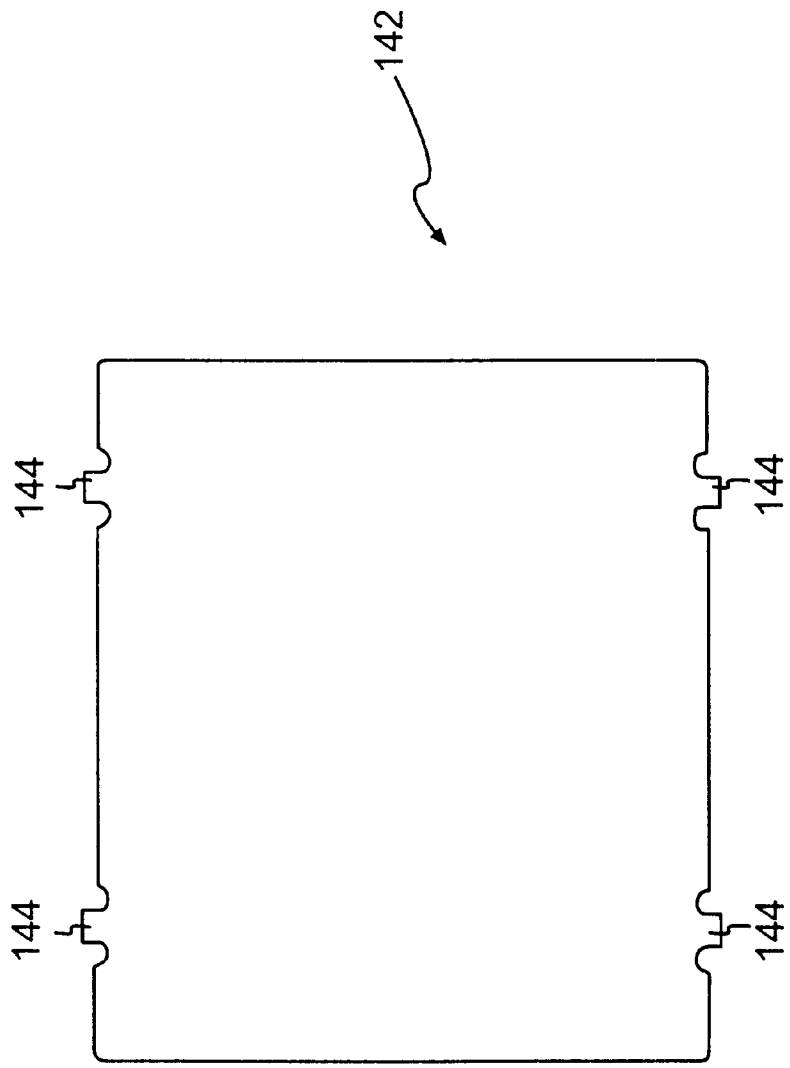
FIG. 13 is a top view of a shelf of the beverage cart illustrated in FIG. 1.

FIG. 13 illustrates the construction of shelf panel 142. Shelf panel 142 includes a plurality of tabs 144 that extend from either side thereof. Tabs 144 engage shelf grooves 120 disposed in shelf wall 140, shelf grooves 102 in right wall panel 40, and shelf grooves 102 in left wall panel 44. Shelf grooves 102 and 120 hold shelf panels 142 in place by providing an engagement surface for tabs 144.

Figure 14:
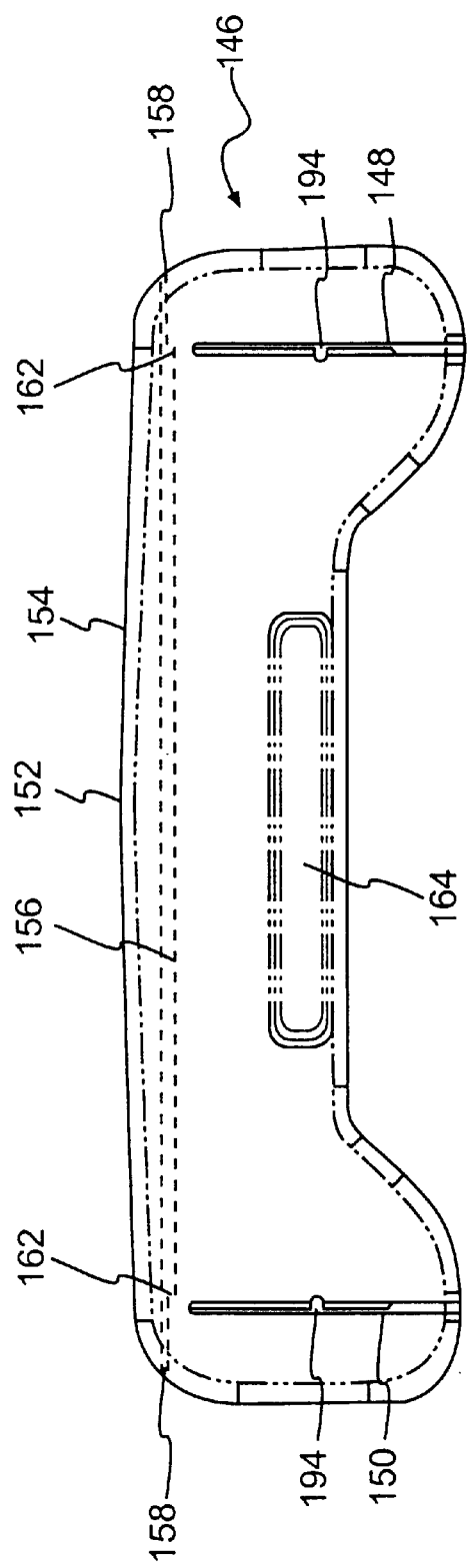
FIG. 14 is a top view of a first portion of a top panel of the beverage cart illustrated in FIG. 1.

As illustrated in FIG. 14, first top panel 146 is essentially U-shaped. First top panel 146, when assembled onto beverage cart 10, extends between first top edge 74 on right wall panel 40 and first top edge 74 on left wall 44. First top panel 146 includes a right wall groove 148 in its underside that slidably engages tab 78 on first top edge 74 of right wall panel 40. Similarly, a left wall groove 150 slidably engages tab 78 on first top edge of left wall panel 44. Front 152 of first top panel 146 includes an edge 154 that curves outwardly, just like front edge 26 of bottom panel 18. A curved groove 156 is cut into the bottom surface of first top panel 146 just behind curved edge 154. Curved groove 156 extends from the right to the left side of first top panel 146. Both of the ends of curved groove 156 include entry ports 158 that permit an advertising panel 160 to slip therein. Notches 162 are provided in curved groove 156 to prevent advertising panel 160 from inadvertently being slipped from curved groove 156. Curved groove 156 is aligned with and cooperates with curved groove 28 in bottom panel 18. Advertising panel 160 extends between curved groove 28 and curved groove 156 and is held therebetween. First top panel 146 may also include a hole 164 therethrough.

Figure 15:
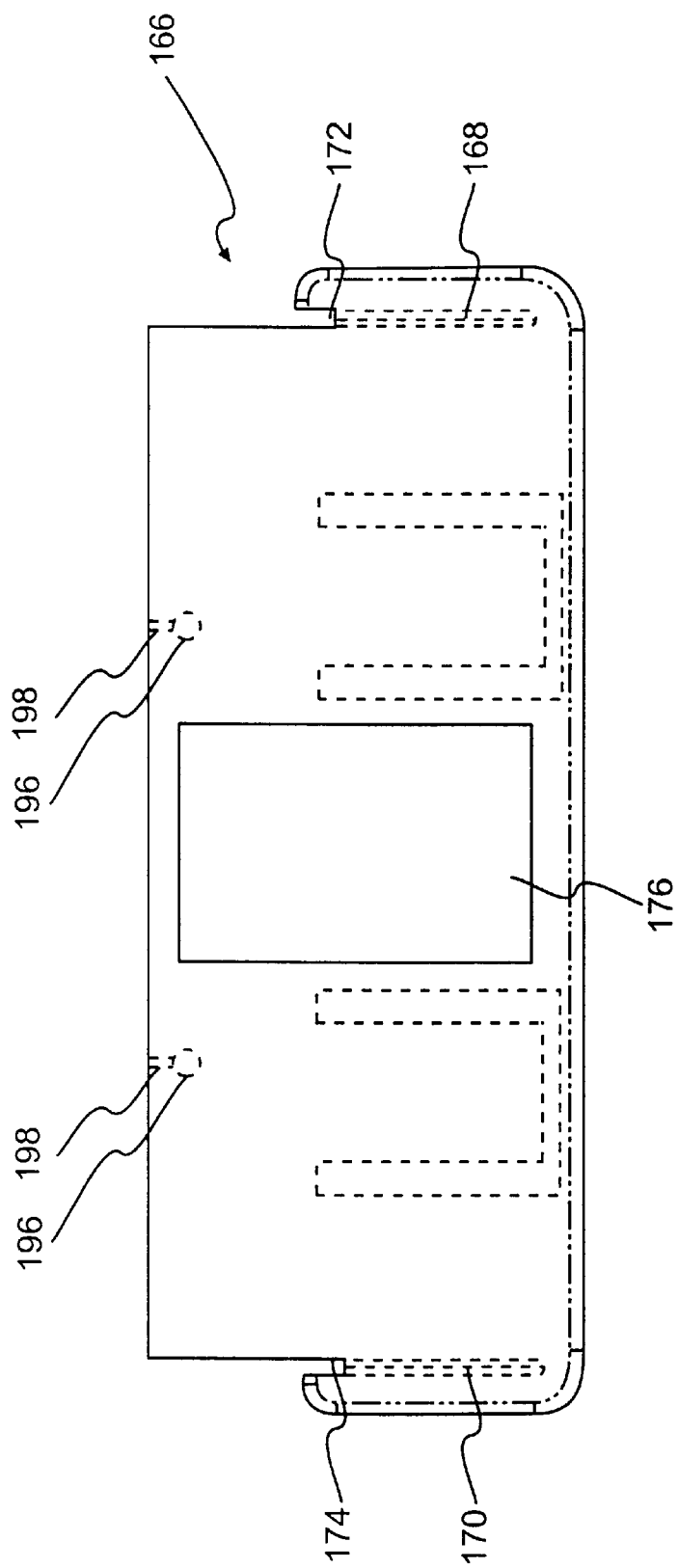
FIG. 15 is a top view of a second portion of a top panel of the beverage cart illustrated in FIG. 1.

FIG. 15 illustrates the details of second top panel 166, which extends across the top of beverage cart 10 at a lower height than first top panel 146. Second top panel 166 extends from second top edge 76 of right wall panel 40 to second top edge 76 of left wall panel 44. Second top panel 166 includes a right groove 168 that engages with tab 80 on second top edge 76 of right wall panel 40. Second top panel 166 also includes a left groove 170 that engages tab 80 on second top edge 76 of left wall panel 44. Second top panel 166 includes a right notch 172 that engages with notch 96 in right wall panel 40. Similarly, a left notch 174 engages with notch 96 in left wall panel 44.

Figure 18:
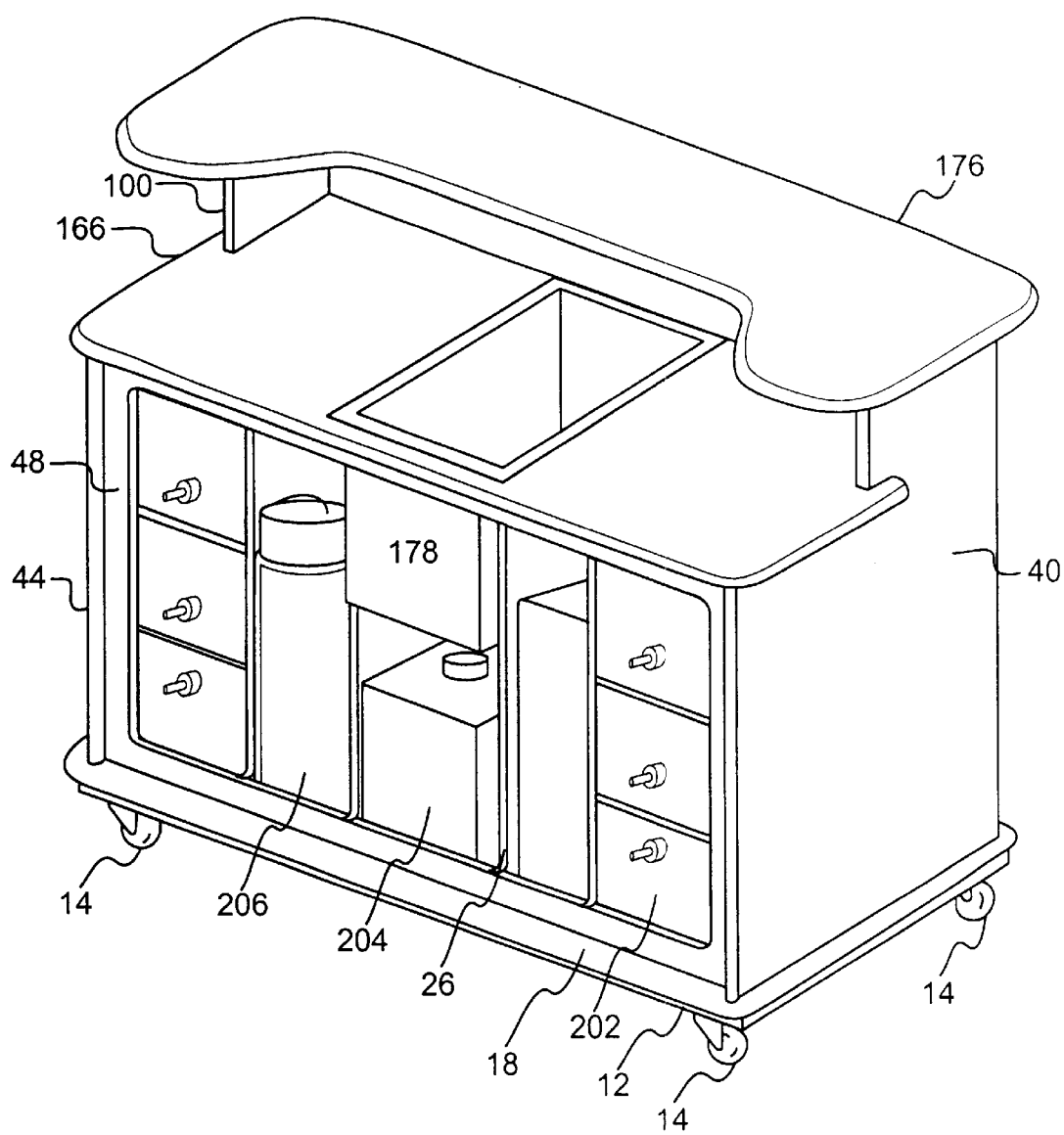
FIG. 18 is a rear perspective view of the beverage cart illustrated in FIG. 1.

A rectangular hole 176 is disposed thorough second top panel 166 in the center thereof. Rectangular hole 176 is provided for a sink 178, as shown in FIG. 18.

The underside of second top panel 166 is provided with two U-shaped grooves 180. Grooves are placed to mate with tabs 122 at top edge 124 of rear wall panel 48.

FIGS. 16 and 17 illustrate attachment element 100 that slides into attachment groove 98 on right wall panel 40 and left wall panel 44. Attachment element 100, like all of the other components of beverage cart 10, is made preferably from polypropylene. Attachment element 100 has two main sections, upper section 182 and lower section 184. Upper section 182 and lower section 184 are preferably integrally molded to one another. Upper section 182 is made of basically a rectangularly-shaped body 186 with two tabs portions 188, one on either side. Tabbed portions 188 have a smaller thickness than rectangular body 186.

Lower portion 184 is disposed at a 90 degree angle from upper portion 182. Lower portion 184 has a rectangular body portion 190 and a protruding portion 192. Once inserted into attachment groove 98, upper portion 182 of attachment element 100 protrudes upwardly to engage notch 194 on the underside of first top panel 146. Once notch 194 is engaged by attachment element 100, first top portion 146 is held securely in place.

Second top portion 166 also may be provided with access holes 196 that are connected to alignment holes 198. Alignment holes 198 align with alignment holes 200 in the horizontal groove 66 on front wall panel 36. If desired, pins (not shown) can be inserted into alignment holes 198, 200 through access holes 196 to secure second top panel 166 to front wall panel.

The assembly of beverage cart 10 will now be described with respect to FIG. 5, which illustrates beverage cart 10 is a disassembled condition.

First, bottom frame 12 with wheels 14 is placed in a suitable location for assembly of beverage cart 10. Next, bottom panel 18 is placed on top of bottom frame 12 so that alignment holes 20 and 22 (if provided) match up. While the order of the assembly of the parts of beverage cart 10 is not important, the following is a description of the preferred manner in which beverage cart 10 is assembled.

Intermediate wall panels 126 and shelf wall panels 140 are first placed on top of bottom panel 18. Front wall panel 36 is then placed into bottom panel 18 while, at the same time, rear wall panel 48 is also fitted onto bottom panel 18. When front wall panel 36 is placed onto bottom panel 18, it fits into front groove 38 in bottom panel 18. Rear wall panel 48 sits in rear groove 50.

Front wall panel 36 and rear wall panel 48 are placed after intermediate wall panels 126 and shelf wall panels 140 because front tabs 141 and rear tabs 143 of intermediate wall panels 126 and shelf wall panels 140 are inserted into vertical grooves 68 (on front wall panel 36) and 116 (on rear wall panel 48). In summary, it is preferred that the interior walls be assembled first and that the exterior walls be assembled around them.

After assembly of the interior wall structure, right wall panel 40 is moved into place. Tabs 58 are inserted into groove 82 in right wall panel 40 so that right wall panel 40 and front wall panel 36 interlock with one another. Tabs 62 on front wall panel are inserted into groove 82 on left wall panel 44 so that front wall panel 36 and left wall panel 44 interlock with one another. At the same time, tabs 110 on rear wall panel 48 engage with groove 88 on right wall panel 40 so that rear wall panel 48 and right wall panel 40 interlock with one another. Tabs 114 on rear wall panel 48 engage with groove 88 on left wall panel 44 so that left wall panel 44 and rear wall panel 48 interlock with one another. Once front wall panel 36, right wall panel 40, left wall panel 44, and rear wall panel 48 are assembled together, the tab (or tongue) and groove fastenings hold the wall panels rigidly and securely together.

Since right wall panel 40 and left wall panel 44 both include shelf grooves 102, shelf wall panels 140 are placed into vertical grooves 68, 116 immediately adjacent right and left wall panels 40 and 44. Since shelf wall panels 140 also include shelf grooves 120, the two adjacent wall panels provide places where tabs 144 can rest so that shelf panels 142 are held securely in place. The two innermost vertical grooves 68, 116 are occupied by intermediate wall panels 126 that do not contain shelf grooves 120. At any point after shelf wall panels 140 and intermediate wall panels 126 are positioned, shelves 142 may be installed.

Next, second top panel 166 is installed so that it engages tabs 80 on second top edges 76 of right wall panel 40 and left wall panel 44. Following this, attachment elements 100 (FIGS. 16 & 17) are inserted into attachment grooves 98. Then, first top panel 146 is installed so that it engages tabs 78 on first top edges 74 of right wall panel 40 and left wall panel 44. Attachment elements 100 in attachment grooves 98 serve as a latch to fix first top panel 146 in place. This completes assembly of the structural elements of beverage cart 10.

FIG. 18 illustrates a completed beverage cart 10 that also includes other elements. For example, a sink 178 has been inserted into rectangular hole 176. In addition, storage containers 202 have been placed on shelves 142. Also, a sink drain container 204 has been positioned under the sink 178 to catch water that drains from sink 178. A beverage flavoring container 206 is also positioned within one of the compartments defined by the structures of beverage cart 10.

Figure 19:
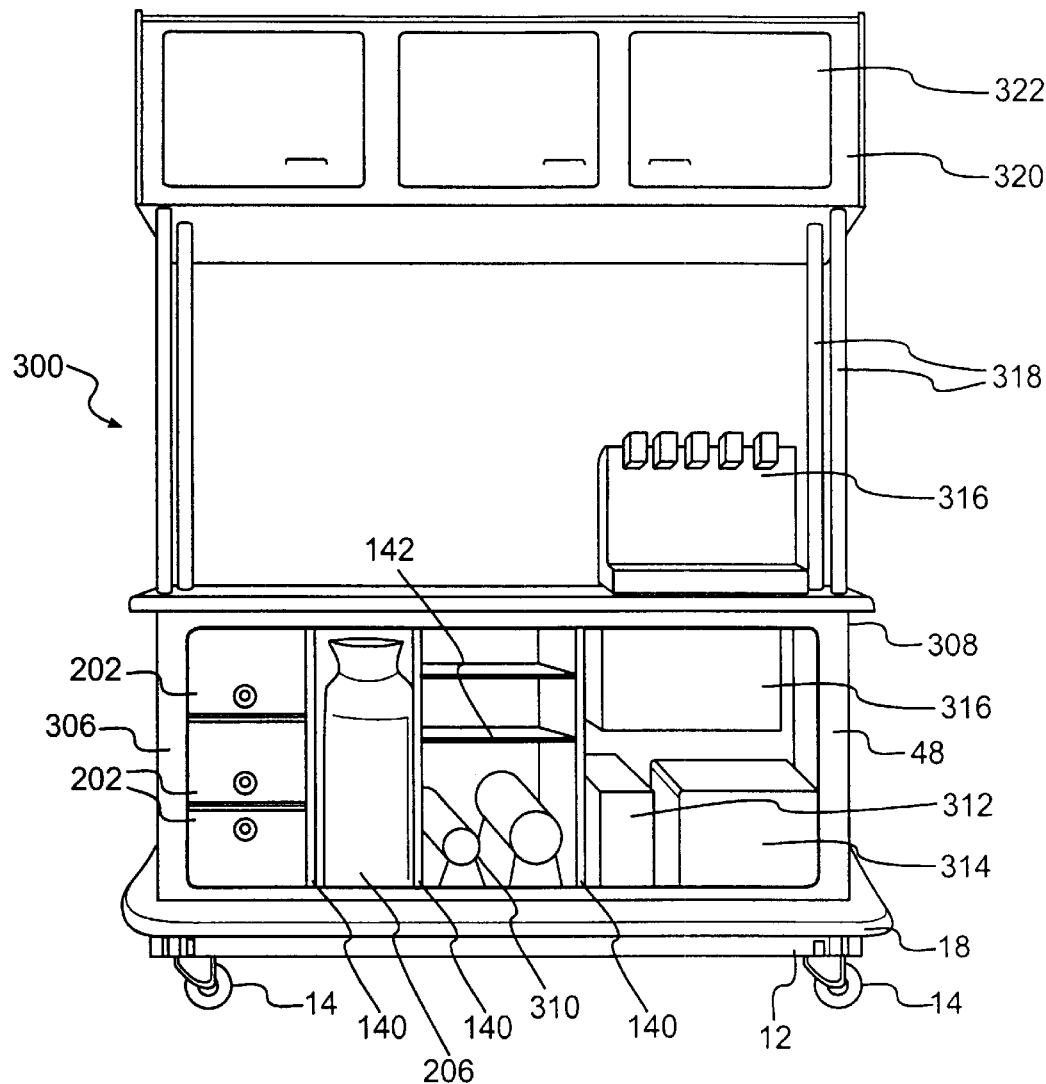
FIG. 19 is a rear elevational view of a second embodiment of the beverage cart according to the teachings of the present invention.
Figure 20:
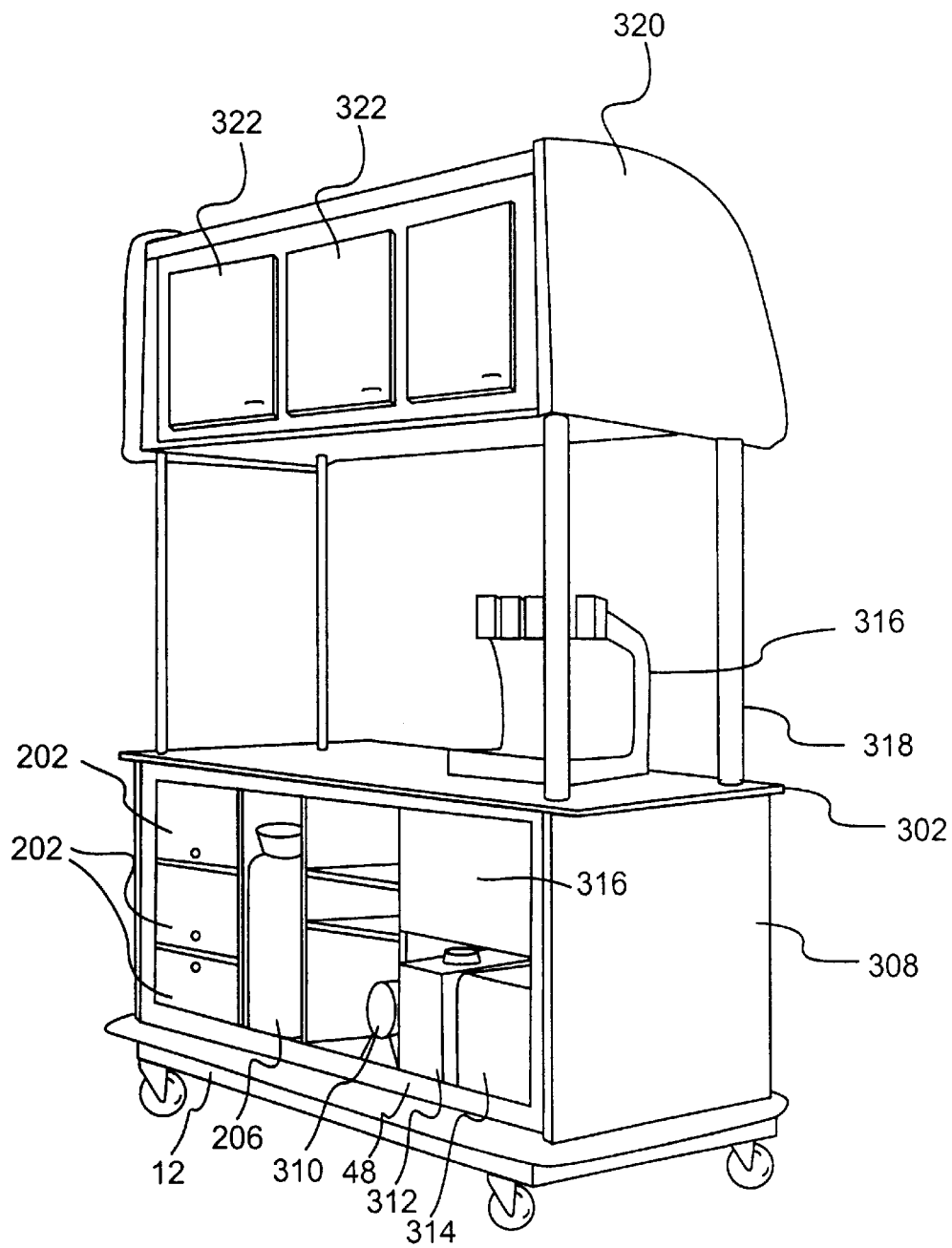
FIG. 20 is a rear perspective view of the beverage cart illustrated in FIG. 19.
Figure 21:
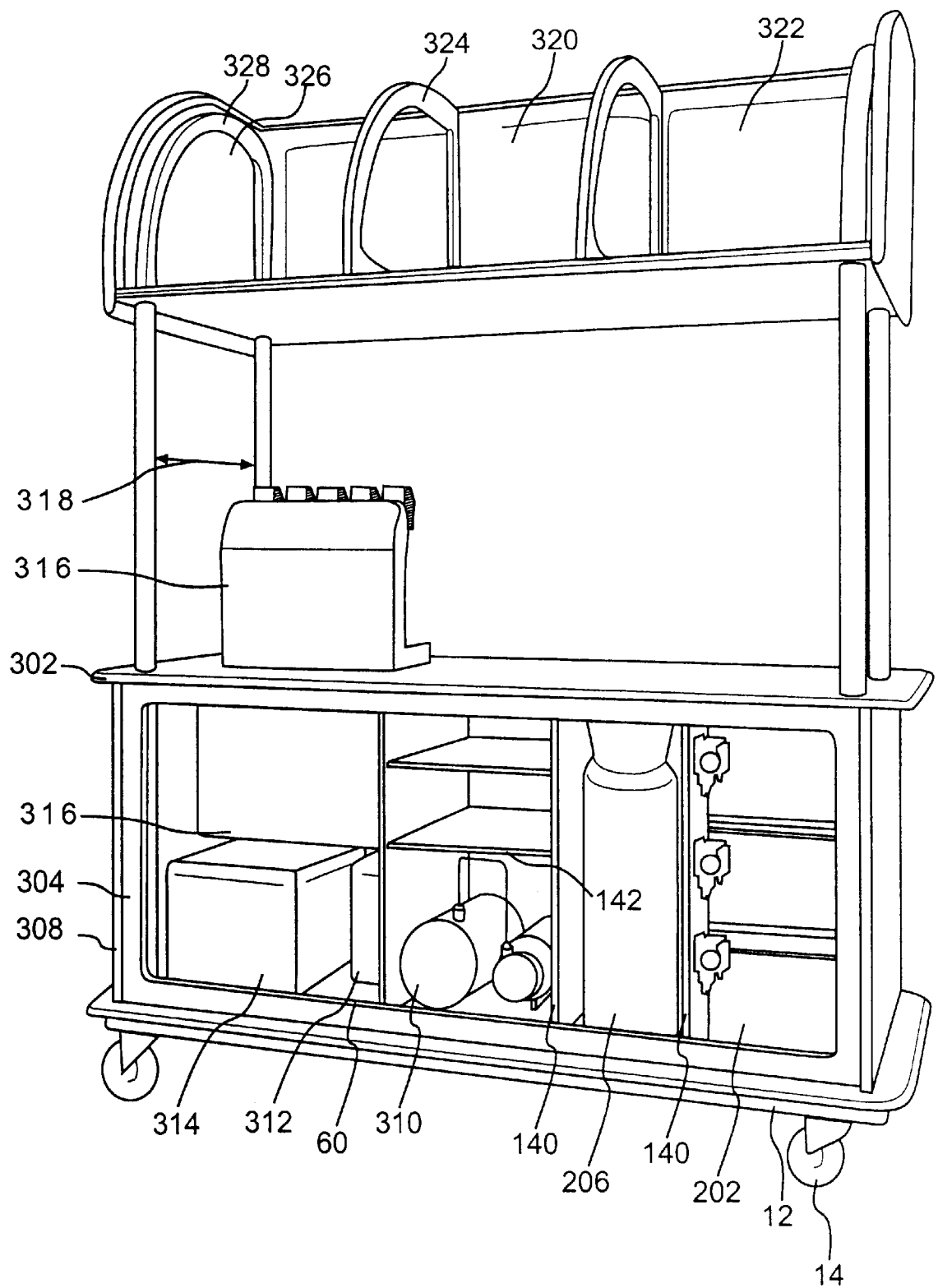
FIG. 21 is a front perspective view of the beverage cart illustrated in FIG. 19.

FIGS. 19–21 illustrate a second embodiment of a beverage cart 300 according to the teachings of the present invention. The construction of beverage cart 300 is very similar to that for beverage cart 10. However, there are a few noteworthy differences between the two embodiments.

As illustrated in FIG. 19, beverage cart 300 has a bottom frame 12 onto which a bottom panel is centered. Like beverage cart 10, beverage cart 300 includes a right wall panel 40, a left wall panel 44, and a rear wall panel 48. In beverage cart 300, however, the top surface is not divided into two separate panels. Instead, beverage cart 300 includes a single top panel 302 that is essentially the same construction of bottom panel 18. In addition, beverage cart 300 includes a front wall panel 304 that is constructed in the same manner as rear wall panel 48. Left wall panel 306 and right wall panel 308 are not L-shaped as in beverage cart 10. However, in all other respects, left and right wall panels 306 and 308 are the same as left wall panel 44 and right wall panel 40. Top panel 302 slidably engages right wall panel 306 and left wall panel 308 in the same manner as with beverage cart 10.

The arrangement of the interior walls for beverage cart 300 also differs from beverage cart 10. As shown in FIG. 19, from left wall panel 306 to right wall panel 308, beverage cart 300 contains three shelf wall panels 44, all of which contain shelf grooves 120. Shelves 142 are suspended between shelf wall panels 44 in the same manner as in beverage cart 10. Beverage cart 300 also contains beverage flavoring container 206 as well as a pump 310, storage containers 312 and 314, and a beverage dispenser 316.

Beverage cart 300 also includes four upright supports 318 that support a canopy 320. While canopy 320 may have any suitable shape, canopy 320 preferably is provided with doors 322 for access to its interior. Canopy 320, therefore, can be used for storage of lightweight items such as cups, lids and straws.

Canopy 320 may also be designed to engage telescopically retractable vertical supports 318 so that canopy 320 can be lowered when beverage cart 300 is moved to a suitable location. For example, canopy 320 may be made to lower to a mid-position between its fully extended position and the top of beverage dispenser 316. In still another embodiment, canopy 320 may be retractable so that it rests on top panel 302. If so constructed, canopy 320 may be provided with a hatch (not shown) on its underside through which beverage dispenser 316 passes when canopy 320 is lowered onto top panel 302.

As illustrated in FIG. 21 (which shows the front of beverage cart 300 with the front panels being transparent), for structural support, canopy 320 may include internal supports 324 between side panels 326. At either end of the canopy, vertical supports 318 may be connected to one another by a vertical support connecting member 328 that also provides structural stability to canopy 320.

It should be noted that each of the components of beverage cart 10 and beverage cart 300 are preferably made of polypropylene. However, as would be understood by those skilled in the art, the present invention is not limited solely to beverage carts made from this material. Beverage carts 10 and 300 could also be made from any suitable alternative material such as another type of plastic (e.g., HDPE), wood, or even metal (e.g., aluminum). Moreover, all of the components do not need to be made from the same material but can be made from materials that differ from one another.

In addition, while not described in detail, it should be noted that any of the features described for beverage cart 10 may be incorporated into beverage cart 300 to the extent that they are compatible. Similarly, elements and features of beverage cart 300 may be incorporated into beverage 10 without deviating from the scope and content of the present invention.

Inasmuch as the present invention is subject to many variations, modifications, and changes in detail, a number of which have been described herein, it is intended that all matter described in this specification or shown in the accompanying drawings be interpreted as illustrative and not in a limiting sense. It is therefore evident that a device constructed according to the present invention, and reasonably equivalent thereto, will accomplish the objectives of the present invention and otherwise substantially improve the art of beverage cart design and assembly.

What is claimed is:

1. A beverage cart, comprising:
   a bottom portion with a substantially rectangular shape, having front, rear, right, and left sides;
   upstanding wall portions extending upwardly from the bottom portion at each of the front, rear, right, and left sides, the upstanding wall portions mating with the bottom portion and rigidly interlocking with one another through tongue and groove fasteners provided thereon;
   a top portion rigidly interlocking with the right and left upstanding wall portions through tongue and groove fasteners provided thereon;
   at least one intermediate upstanding wall portion disposed between the right and left upstanding wall portions, the at least one intermediate upstanding wall portion rigidly interconnecting with the front and rear upstanding wall portions through tongue and groove fasteners provided thereon; and
   at least one horizontal shelf portion disposed between any two of the upstanding wall portions, the at least one horizontal shelf rigidly interlocking with the two upstanding wall portions through tongue and groove fasteners provided thereon,
   wherein at least the rear upstanding wall portion has a central region cut out to permit access to the interior of the beverage cart, the central region extending substantially between the right and left upstanding wall portions and the top and bottom portions.

2. The beverage cart of claim 1, further comprising:
   a first curved portion extending forwardly from the bottom portion;
   a first curved groove cut into a top surface of the first curved portion and extending substantially from the left side to the right side of the bottom portion;
   a second curved portion extending forwardly from the top portion;
   a second curved groove cut into a bottom surface the second curved portion and extending substantially from the left side to the right side of the top portion; and
   a flexible sheet slidable into and containable between the first and second grooves.

3. The beverage cart of claim 1, further comprising:
   at least one vertical support extending upwardly from the top portion; and
   a canopy, connected to the at least one vertical support, extending over at least part of the top portion.

4. The beverage cart of claim 3, further comprising:
   a storage compartment within the canopy.

5. The beverage cart of claim 3, wherein the canopy is adjustable in height relative to the top portion.

6. The beverage cart of claim 1, further comprising:
   wheels attached to a bottom side of the bottom portion.

7. The beverage cart of claim 1, wherein the cart's respective components are easily assembled and disassembled.

8. The beverage cart of claim 1, wherein the cart's respective components are made of plastic.

9. The beverage cart of claim 8, wherein the beverage cart is made of polypropylene.

10. The beverage cart of claim 9, wherein the polypropylene is scratch resistant.

11. The beverage cart of claim 9, wherein the polypropylene is resistant to wear by environmental elements.

12. The beverage cart of claim 11, wherein the polypropylene is resistant to water.

13. The beverage cart of claim 11, wherein the polypropylene is resistant to ultra-violet light.

14. The beverage cart of claim 1, wherein:
   the right and left upstanding sides are L-shaped, thereby providing upper and lower connecting portions; and
   the top portion includes a first top portion and a second top portion, the first top portion rigidly interconnecting with the upper connecting portions of the right and left upstanding sides and the second top portion rigidly interconnecting with the lower connecting portion of the right and left upstanding sides.

15. The beverage cart of claim 14, further comprising:
   a first curved portion extending forwardly from the bottom portion;
   a first curved groove cut into a top surface of the first curved portion and extending substantially from the left side to the right side of the bottom portion;
   a second curved portion extending forwardly from the first top portion;
   a second curved groove cut into a bottom surface the second curved portion and extending substantially from the left side to the right side of the first top portion; and
   a flexible sheet slidable into and containable between the first and second grooves.

16. The beverage cart of claim 14, further comprising:
   at least one vertical support extending upwardly from the first or second top portions; and
   a canopy, connected to the at least one vertical support, extending over at least part of the top portion.

17. The beverage cart of claim 16, further comprising:
   a storage compartment within the canopy.

18. The beverage cart of claim 16, wherein the canopy is adjustable in height relative to the top portion.

19. The beverage cart of claim 14, further comprising:
   a sink disposed through the second top portion.

20. The beverage cart of claim 14, further comprising:
   wheels attached to a bottom side of the bottom portion.

21. The beverage cart of claim 14, wherein the cart's respective components are easily assembled and disassembled.

22. The beverage cart of claim 14, wherein the cart's respective components are made of plastic.

23. The beverage cart of claim 22, wherein the beverage cart is made of polypropylene.

24. The beverage cart of claim 23, wherein the polypropylene is scratch resistant.

25. The beverage cart of claim 23, wherein the polypropylene is resistant to wear by environmental elements.

26. The beverage cart of claim 25, wherein the polypropylene is resistant to water.

27. The beverage cart of claim 25, wherein the polypropylene is resistant to ultra-violet light.

28. A beverage cart, comprising:
   a bottom portion with a substantially rectangular shape, having front, rear, right, and left sides;
   upstanding wall portions extending upwardly from the bottom portion at each of the front, rear, right, and left sides. the upstanding wall portions mating with the bottom portion and rigidly interlocking with one another through tongue and groove fasteners provided thereon;

a top portion rigidly interlocking with the right and left upstanding wall portions through tongue and groove fasteners provided thereon;

at least one intermediate upstanding, wall portion disposed between the right and left upstanding wall portions, the at least one intermediate upstanding wall portion rigidly interconnecting with the front and rear upstanding wall portions through tongue and groove fasteners provided thereon;

at least one horizontal shelf portion disposed between any two of the upstanding wall portions, the at least one horizontal shelf rigidly interlocking with the two upstanding wall portions through tongue and groove fasteners provided thereon, wherein at least the rear upstanding wall portion has a central region cut out to permit access to the interior of the beverage cart;

a first curved portion extending forwardly from the bottom portion;

a first curved groove cut into a top surface of the first curved portion and extending substantially from the left side to the right side of the bottom portion;

a second curved portion extending forwardly from the top portion;

a second curved groove cut into a bottom surface the second curved portion and extending substantially from the left side to the right side of the top portion; and a flexible sheet slidable into and containable between the first and second grooves.

29. A beverage cart, comprising:

a bottom portion with a substantially rectangular shape, having front, rear, right, and left sides;

upstanding wall portions extending upwardly from the bottom portion at each of the front, rear, right, and left sides, the upstanding wall portions mating with the bottom portion and rigidly interlocking with one another through tongue and groove fasteners provided thereon;

a top portion rigidly interlocking with the right and left upstanding wall portions through tongue and groove fasteners provided thereon;

at least one intermediate upstanding wall portion disposed between the right and left upstanding wall portions, the at least one intermediate upstanding wall portion rigidly interconnecting with the front and rear upstanding wall portions through tongue and groove fasteners provided thereon;

at least one horizontal shelf portion disposed between any two of the upstanding wall portions, the at least one horizontal shelf rigidly interlocking with the two upstanding wall portions through tongue and groove fasteners provided thereon, wherein at least the rear upstanding wall portion has a central region cut out to permit access to the interior of the beverage cart, wherein the right and left upstanding sides are L-shaped, thereby providing upper and lower connecting portions, and wherein the top portion includes a first top portion and a second top portion, the first top portion rigidly interconnecting with the upper connecting portions of the right and left upstanding sides and the second top portion rigidly interconnecting with the lower connecting portion of the right and left upstanding sides;

a first curved portion extending forwardly from the bottom portion;

a first curved groove cut into a top surface of the first curved portion and extending substantially from the left side to the right side of the bottom portion;

a second curved portion extending forwardly from the first top portion;

a second curved groove cut into a bottom surface the second curved portion and extending substantially from the left side to the right side of the first top portion; and a flexible sheet slidable into and containable between the first and second grooves.

* * * * *